United States Patent [19]

Ishimura et al.

[11] Patent Number: 5,316,563
[45] Date of Patent: May 31, 1994

[54] VACUUM DEGASSING METHOD AND ITS APPARATUS

[75] Inventors: Kazuhiko Ishimura; Fumiaki Saito; Masaaki Yoshikawa; Misao Okada; Shinsuke Nakajima, all of Yokohama, Japan

[73] Assignee: Asahi Glass Company Ltd., Tokyo, Japan

[21] Appl. No.: 5,798

[22] Filed: Jan. 19, 1993

[30] Foreign Application Priority Data

Jan. 20, 1992 [JP] Japan .................................. 4-007694

[51] Int. Cl.$^5$ ............................................. C03B 5/173
[52] U.S. Cl. ................................. 65/32.5; 65/134; 65/136; 266/209; 261/DIG. 19; 95/248; 95/266
[58] Field of Search .................... 65/134, 136, 32.5; 266/209; 261/DIG. 19; 75/510, 508; 55/55, 189, 203, 207; 45/172, 175, 249, 266, 250

[56] References Cited

U.S. PATENT DOCUMENTS

| | | |
|---|---|---|
| 1,598,308 | 8/1926 | Pike . |
| 1,921,060 | 8/1933 | Williams .................. 266/209 |
| 2,587,793 | 4/1952 | Waldron ................... 266/209 |
| 3,042,510 | 7/1962 | Armbruster ............... 65/134 |
| 3,179,512 | 4/1965 | Olsson ..................... 266/209 |
| 3,321,300 | 8/1964 | Worner .................... 266/209 |
| 3,402,921 | 9/1968 | Hart ........................ 266/209 |
| 3,480,420 | 11/1966 | Loukes ..................... 65/168 |
| 3,547,622 | 6/1968 | Hutchinson ............... 75/508 |
| 3,558,121 | 1/1971 | Lenne ...................... 266/209 |
| 3,572,671 | 3/1971 | Worner .................... 266/209 |
| 3,610,600 | 10/1971 | Schnake ................... 65/130 |
| 3,942,968 | 3/1976 | Pieper . |
| 4,045,336 | 8/1977 | Isteri ....................... 95/266 |
| 4,325,724 | 4/1982 | Froberg . |
| 4,344,774 | 8/1982 | Skipper ................... 95/248 |
| 4,541,865 | 9/1985 | Sherwood ................ 266/209 |

FOREIGN PATENT DOCUMENTS

| | | |
|---|---|---|
| 1485634 | 5/1967 | France . |
| 2115176 | 7/1972 | France . |
| 2302345 | 9/1976 | France . |
| 333020 | 2/1991 | Japan . |
| 1023413 | 3/1966 | United Kingdom . |

*Primary Examiner*—W. Gary Jones
*Assistant Examiner*—John Hoffmann
*Attorney, Agent, or Firm*—Oblon, Spivak, McClelland, Maier & Neustadt

[57] ABSTRACT

A vacuum degassing method wherein a molten substance at an elevated temperature in a storage tank is sucked to a vacuum degassing vessel through an uprising pipe connecting the storage tank and the vacuum degassing vessel by maintaining the vacuum degassing vessel at a negative pressure, the molten substance is degassed and the degassed molten substance falls to a guiding duct through a downfalling pipe connecting the vacuum degassing vessel and the guiding duct characterized by that a first flow quantity of the molten substance rising in the uprising pipe is restrained and a second flow quantity thereof falling in the downfalling pipe is controlled thereby maintaining a quantity of the molten substance in the vacuum degassing vessel at a pertinent level.

4 Claims, 8 Drawing Sheets

FIGURE 8

VACUUM DEGASSING METHOD AND ITS APPARATUS

BACKGROUND OF THE INVENTION

1. Field of the Invention

This invention relates to a vacuum degassing method and its apparatus for removing bubbles in a molten substance at elevated temperature such as molten glass or molten metal, particularly to a vacuum degassing method and an improvement of its apparatus which is effective in a process for continuously feeding molten substance at elevated temperature.

2. Discussion of the Related Art

Conventionally, as such a vacuum degassing apparatus, there is one disclosed, for instance, in Japanese Examined Patent Publication No. 4205/1969.

Figure 7:
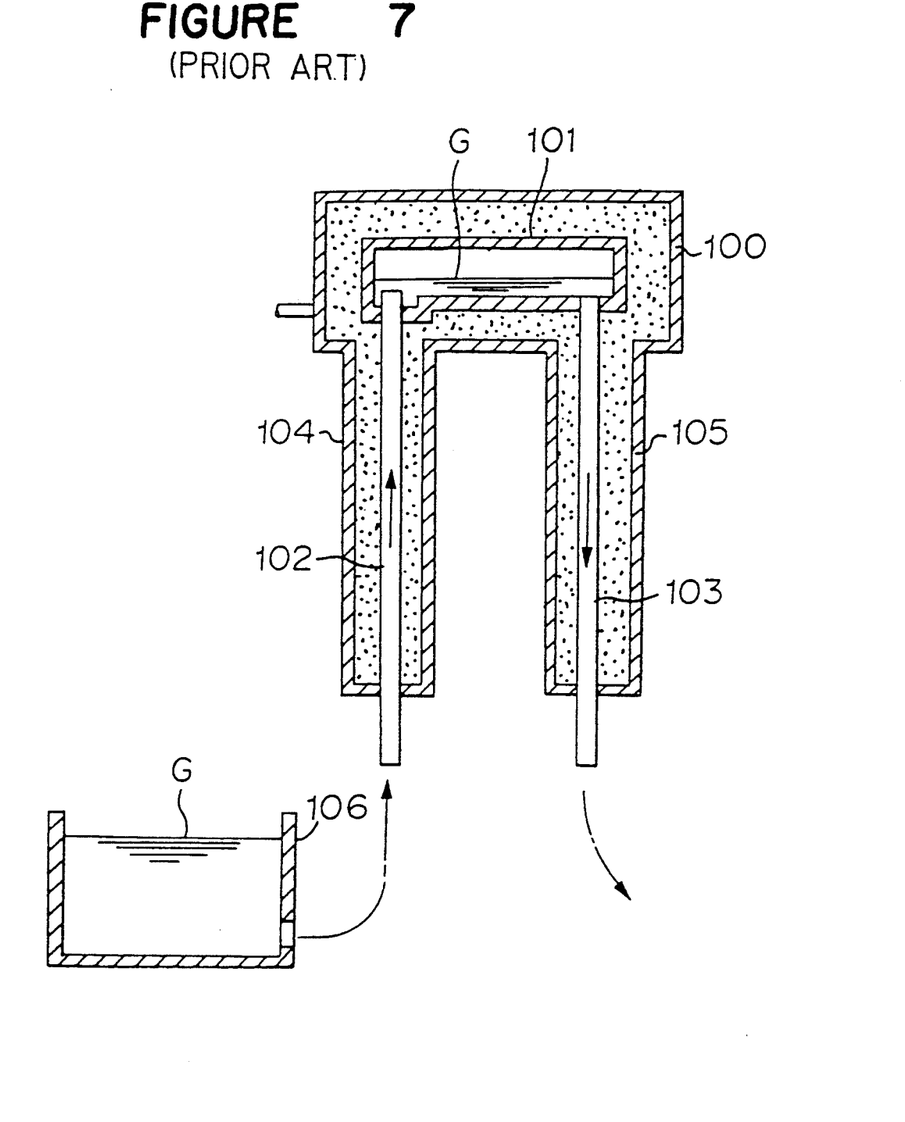
FIG. 7 is a sectional diagram of a conventional vacuum degassing apparatus.

As shown in FIG. 7, this apparatus is employed in a process wherein molten glass G as a molten substance at elevated temperature in a melting tank 106, is degassed and is continuously fed to a successive treatment furnace. As shown in FIG. 7, a vacuum housing 100 which is sucked in vacuum, accommodates a vacuum degassing vessel 101. This vacuum degassing vessel 101 is connected to an uprising pipe 102 wherein the molten glass G rises as a molten substance at elevated temperature before degassing, and is introduced into the vacuum degassing vessel 101. The vacuum degassing vessel 101 is connected to a downfalling pipe 103 wherein the molten glass G after degassing falls and is led out to a successive treatment furnace. Casings 104 and 105 are provided around the uprising pipe 102 and the downfalling pipe 103, respectively, for insulatively coating the uprising pipe 102 and the downfalling pipe 103, which are connected to the vacuum housing 100.

Furthermore, the uprising pipe 102 and the downfalling pipe 103 are made of noble metals such as platinum, since temperatures of these pipes are elevated up to 1200° to 1500° C. by the molten glass G.

In the vacuum degassing apparatus of this kind, a pressure inside the vacuum degassing vessel 101, is reduced to 1/20 to ⅓ atmospheric pressure. Therefore, it is necessary to set a difference of levels of the molten glass G in the melting tank 106 and the molten glass G in the vacuum degassing vessel 101, to be approximately 3.5 m. Accordingly, since lengths of the uprising pipe 102 and the downfalling pipe 103 are prolonged, the thermal expansion quantities of the uprising pipe 102 and the downfalling pipe 103, are enlarged. Accordingly, the structure of the vacuum degassing apparatus becomes unstable and is devoid of safety.

Furthermore, since, in the vacuum degassing apparatus of this kind, the molten glass G is led from the uprising pipe 102 to the downfalling pipe 103 only by decompression in the vacuum degassing vessel 101, the flow control of the molten glass G is difficult.

SUMMARY OF THE INVENTION

It is an object of the present invention to provide a vacuum degassing method and its apparatus wherein the safety of the vacuum degassing apparatus is promoted and the flow quantity control of the molten glass is facilitated.

According to a first aspect of this invention, there is provided a vacuum degassing method wherein a molten substance at an elevated temperature in a storage tank is sucked to a vacuum degassing vessel through an uprising pipe connecting the storage tank and the vacuum degassing vessel by maintaining the vacuum degassing vessel at a negative pressure, the molten substance is degassed and the degassed molten substance falls to a guiding duct through a downfalling pipe connecting the vacuum degassing vessel and the guiding duct characterized by that a first flow quantity of the molten substance rising in the uprising pipe is restrained and a second flow quantity thereof falling and/or flowing downward in the downfalling pipe is controlled thereby maintaining a quantity of the molten substance in the vacuum degassing vessel at a pertinent amount.

According to a second aspect of this invention, there is provided a vacuum degassing method according to the first aspect, wherein the quantity of the molten substance is maintained at a pertinent amount by restraining the first flow quantity of the molten substance rising in the uprising pipe and by controlling the second flow quantity thereof falling in the downfalling pipe, and a first surface of material of the molten substance in the vacuum degassing vessel is maintained at a first level being the same with a second level of a second surface thereof in the storage tank.

According to a third aspect of this invention, there is provided a vacuum degassing apparatus comprising:

a vacuum housing being sucked in vacuum;

a vacuum degassing vessel accommodated in the vacuum housing for degassing a molten substance at an elevated temperature;

an uprising pipe connected to the vacuum degassing vessel for rising and introducing the molten substance before degassing into the vacuum degassing vessel;

a downfalling pipe connected to the vacuum degassing vessel for falling and leading out the molten substance degassed by the vacuum degassing vessel;

a first flow quantity controlling means provided in the uprising pipe for restraining a first flow quantity of the molten substance rising in the uprising pipe; and a second flow quantity controlling means provided in the downfalling pipe for controlling a second flow quantity of the molten substance falling in the downfalling pipe.

According to a fourth aspect of this invention, there is provided a vacuum degassing apparatus according to the third aspect, wherein the first and the second flow quantity controlling means maintain a first surface of the molten substance in the vacuum degassing device at a first level the same with a second level of a second surface thereof in storage before degassing.

According to the present invention, the flow quantity of the molten substance at elevated temperature rising in the uprising pipe, is restrained by the first flow quantity controlling means, and the flow quantity of the molten substance at elevated temperature falling in the downfalling pipe, is increased by the second flow quantity controlling means, thereby maintaining the molten substance at elevated temperature in the vacuum degassing vessel at a pertinent amount.

Accordingly, it is possible to reduce the difference between the levels of the molten substance in the vacuum degassing vessel and that in a storage tank and the guiding duct, or to nullify the level difference. In this way, since the lengths of the uprising pipe and the downfalling pipe can be set to be short, the thermal expansion quantities of the uprising pipe and the downfalling pipe can be reduced.

DESCRIPTION OF THE PREFERRED EMBODIMENTS

A detailed explanation will be given of a vacuum degassing method and its apparatus according to the present invention in reference to the attached drawings, as follows.

Figure 1:
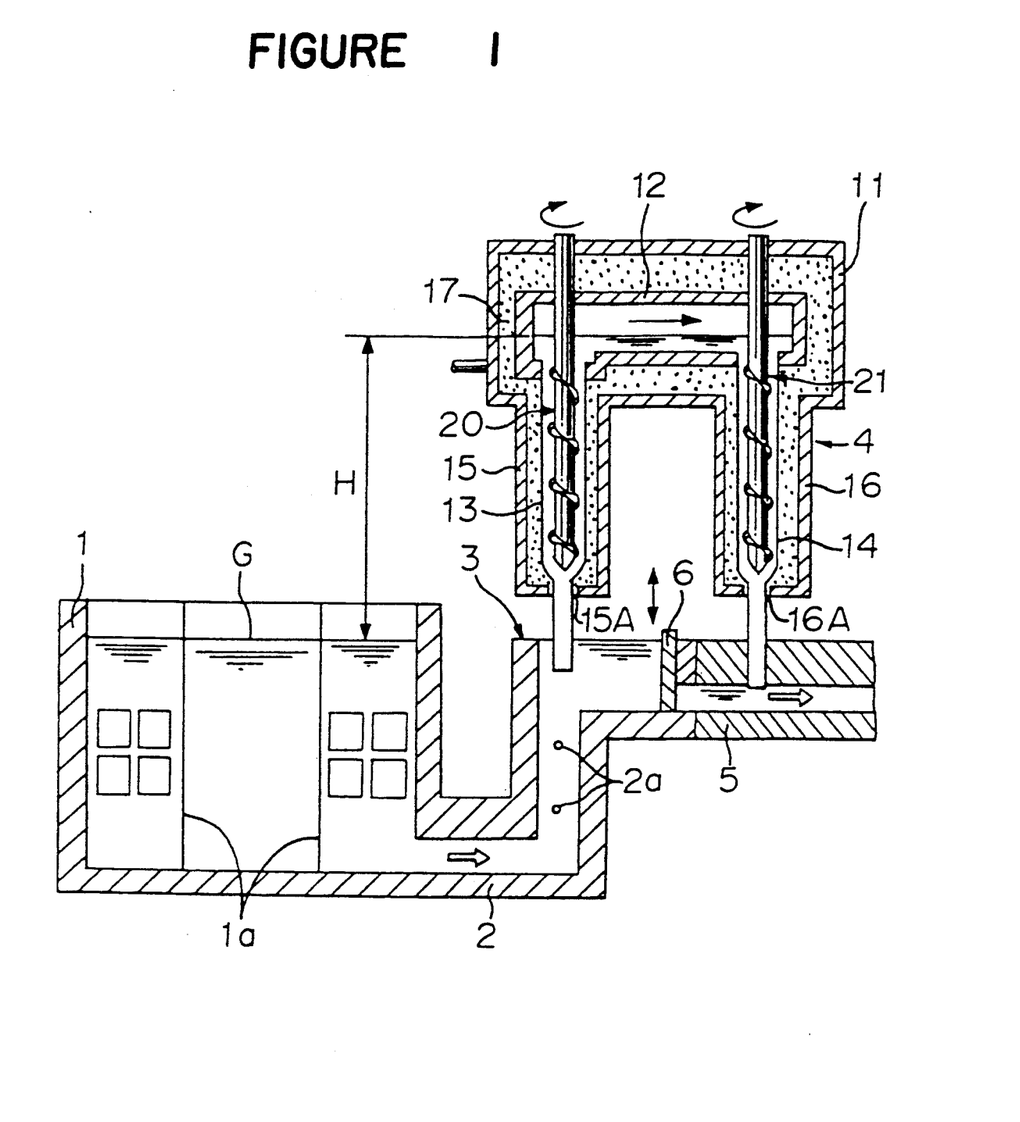
FIG. 1 is a sectional diagram showing the side of a process integrated with a first embodiment of a vacuum degassing apparatus according to the present invention.
Figure 2:
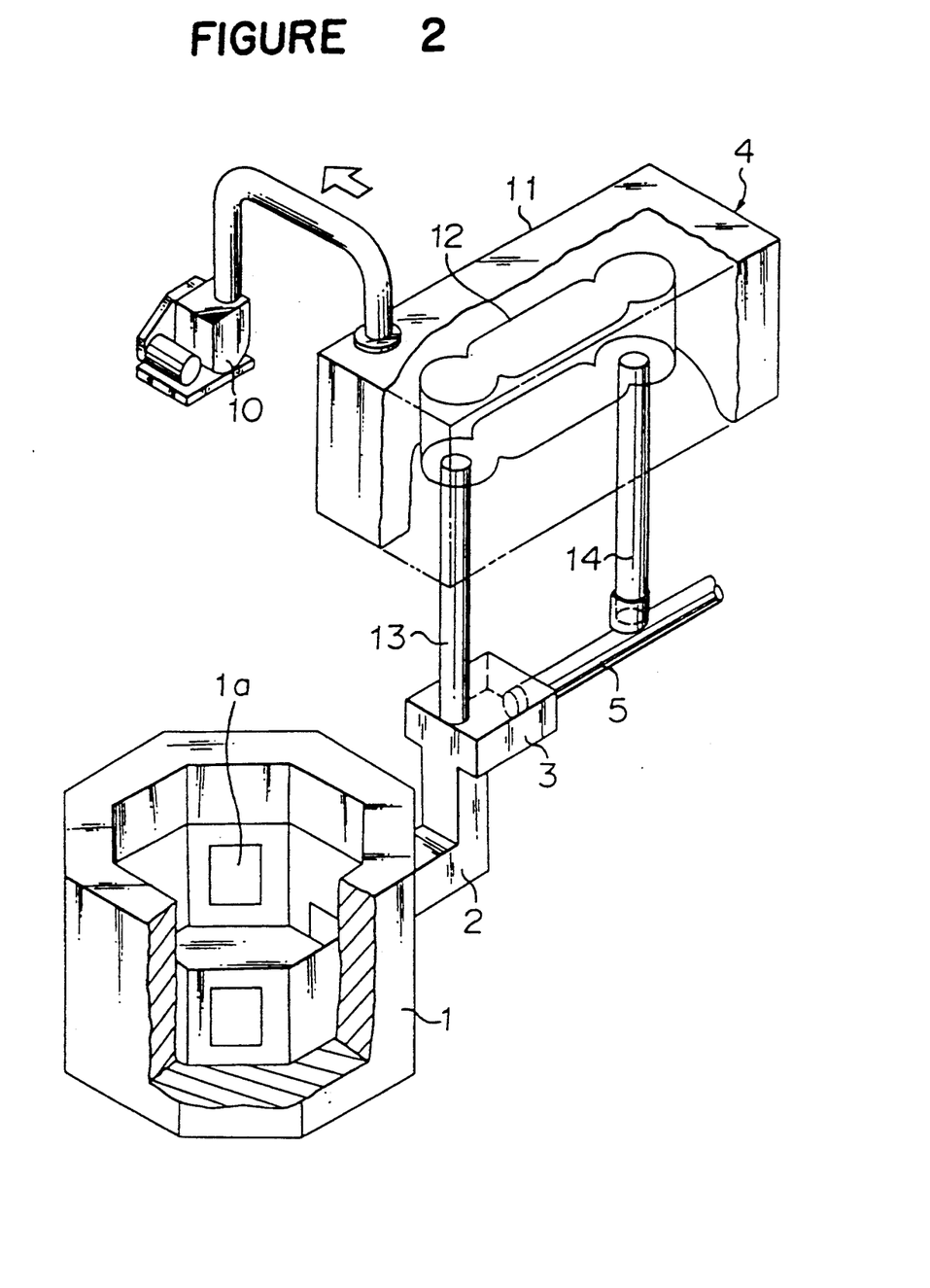
FIG. 2 is a perspective view of FIG. 1.

FIGS. 1 and 2 show a first embodiment of an example of a process wherein molten glass is degassed and is continuously fed to a successive treatment furnace.

As shown in FIGS. 1 and 2, a melting tank 1 heats molten glass G by plate-like electrodes 1a, and a guiding duct 2 is connected to the bottom of a side wall of the melting tank 1. The guiding duct 2 leads the molten glass G from the melting tank 1 to a storage tank 3, while heating the molten glass G by rod-like electrodes 2a. The storage tank 3 temporarily stores the molten glass G. The molten glass G stored in the storage tank 3 is degassed in a vacuum degassing vessel of the vacuum degassing apparatus 4 under a reduced pressure. The reduced pressure in the vacuum degassing vessel in this case is set to be 1/20 to ⅓ atmospheric pressure.

Furthermore, a difference H between levels of the molten glass G in the melting tank and the molten glass G in the vacuum degassing vessel, is set to be smaller than a level difference to which the "siphon" principle is applicable. Generally speaking, when the pressure in the vacuum degassing vessel is set to be 1/20 to ⅓ atmospheric pressure, the difference between the levels of the molten glass G in the melting tank and the molten glass G in the vacuum degassing vessel, is to be approximately 3.5 m to apply the "siphon" principle to the vacuum degassing apparatus 4, which is well known. Accordingly, in the vacuum degassing apparatus 4, the difference H between the levels of the molten glass G in the melting tank and the molten glass G in the vacuum degassing vessel, is set to be smaller than 3.5 m.

Furthermore, the degassed molten glass G is led to a guiding duct 5 which communicates with the storage tank 3. A partition plate 6 is provided between the storage tank 3 and the guiding duct 5. The partition plate 6 maintains the storage tank 3 and the guiding duct 5 in a closed state.

As shown in FIG. 2, the vacuum degassing apparatus 4 is provided with a vacuum housing 11 made of stainless steel. The vacuum housing 11 is sucked in vacuum by a vacuum pump 10. A vacuum degassing vessel 12 is provided in the vacuum housing 11. An uprising pipe 13 made of platinum is fixedly connected to a side of the bottom of the vacuum degassing vessel 12, and the lower end portion of the uprising pipe 13 is immersed in the molten glass G stored in the storage tank 3.

On the other hand, a downcoming pipe 14 is connected to the other side of the bottom of the vacuum degassing vessel 12, which is made of platinum as in the uprising pipe 13. The lower end portion of the downfalling pipe 14 is immersed in the molten glass G in the guiding duct 5. The position of the lower end portion of the downfalling pipe 14 is set to be a little lower than that of the uprising pipe 13. The uprising pipe 13 and the downfalling pipe 14 are heated by electricity based on a temperature control system, not shown, and are maintained at predetermined temperatures.

Furthermore, casings 15 and 16 made of stainless steel are provided around the uprising pipe 13 and the downfalling pipe 14, respectively. The casings 15 and 16 are connected to the vacuum housing 11. The lower end portions of the uprising pipe 13 and the downfalling pipe 14 are exposed to the outside from openings 15A and 16A of the casings 15 and 16. An insulating material 17 is provided in the vacuum housing 11, and the casings 15 and 16, surrounding the uprising pipe 13 and the downfalling pipe 14.

Figure 3:
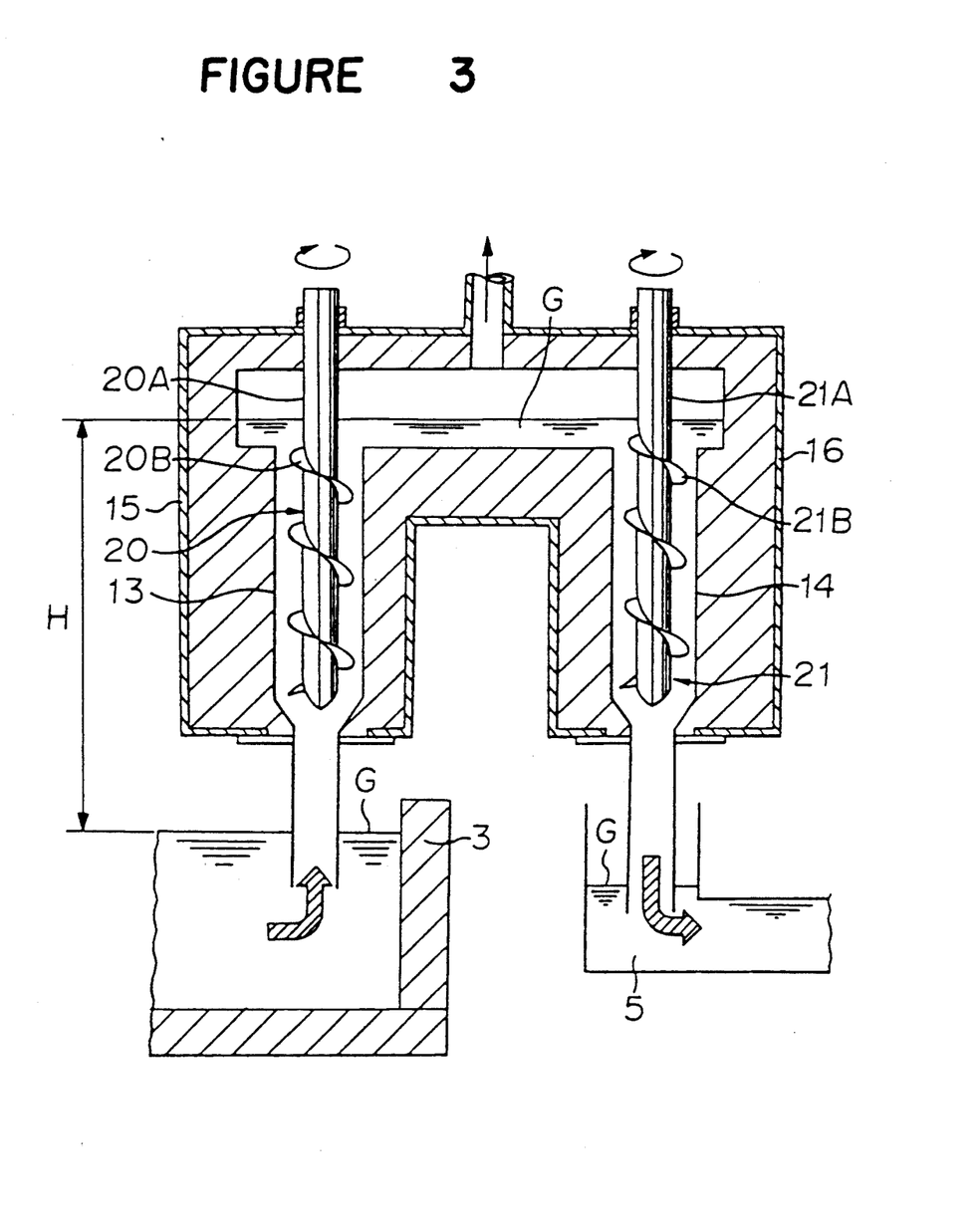
FIG. 3 is a sectional diagram showing the first embodiment of a vacuum degassing apparatus according to the present invention.

As shown in FIG. 3, a screw 20 and a screw 21 are rotatably and coaxially provided in the uprising pipe 13 and the downfalling pipe 14. The screws 20 and 21 are made of platinum. The screw 20 consists of a shaft 20A and a blade 20B. The blade 20B is helically provided on the shaft 20A, so that the blade 20B pushes down the molten glass G in the downward direction, when the shaft 20A rotates in the clockwise direction.

Furthermore, the screw 21 consists of a shaft 21A and a blade 21B as in the screw 20, which pushes down the molten glass G in the downward direction, when the shaft 21A rotates in the clockwise direction. Top end portions of the shafts 20A and 21A are connected with motors (not shown), which rotate the screws 20 and 21 in the clockwise direction.

An explanation will be given of the operation of the first embodiment of the vacuum degassing device according to the present invention, composed as above.

First, as a pre-stage for operating the vacuum degassing apparatus 4, the molten glass G is introduced into the vacuum degassing apparatus 4. The partition plate 6 is opened, the molten glass G in the storage tank is introduced into the side of the guiding duct 5, and the lower end portions of the uprising pipe 13 and the downfalling pipe 14 are immersed in the molten glass G. After the immersing is finished, the vacuum pump 10 is operated and the inside of the vacuum degassing vessel 12 is made into a negative pressure state of 1/20 to ⅓ atmospheric pressure.

The molten glass G is sucked to rise through the uprising pipe 13 and the downfalling pipe 14, into the vacuum degassing vessel 12. Accordingly, the molten glass G is introduced into the vacuum degassing device 4. However, since the difference between the levels of the molten glass G in the melting tank and the molten glass G in the vacuum degassing vessel is set to be smaller than the level difference for sufficiently operating the "siphon" principle, the molten glass G overflows in the vacuum degassing vessel.

To prevent the overflow, the apparatus is operated as follows. When the screws 20 and 21 are rotated in the clockwise direction by driving motors (not shown) connected to the screws 20 and 21, the molten glass G rising in the uprising pipe 13 and the downfalling pipe 14, is pushed down in the downward direction, by the blades 20B and 21B. Accordingly, the rising flow rate of the molten glass G rising in the uprising pipe 13 and the downfalling pipe 14, is retarded. In this case, the rising flow rate of the molten glass G rising in the uprising pipe 13 and the downfalling pipe 14, is controlled so that the molten glass G moves from the uprising pipe 13 to the downfalling pipe 14, as in the "siphon" principle. When the partition plate 6 is closed at this stage, the molten glass G which has risen through the uprising pipe 13 and has been degassed in the vacuum degassing vessel 12, is introduced to the side of the guiding duct 5 through the downfalling pipe 14. In this case, the flow rate of the molten glass G rising in the uprising pipe 13 is the same with the flow rate of the molten glass G falling in the downfalling pipe 14. In this way, the difference H between the levels of the molten glass G in the melting tank and the molten glass G in the vacuum degassing vessel, which is necessitated in the conventional vacuum degassing apparatus which is not provided with the screws 20 and 21, can be set at a small value.

Accordingly, even when the difference H between the levels of the molten glass G in the melting tank and the molten glass G in the vacuum degassing vessel, is set to be small, by providing the screws 20 and 21, the uprising quantity of the molten glass G rising in the uprising pipe 13 is reduced by the screw 20 and the downfalling quantity of the molten glass G falling in the downfalling pipe 14, is increased by the screw 21. Therefore, the rising quantity of the molten glass G rising in the uprising pipe 13 and the downfalling quantity of the molten glass G falling in the downfalling pipe 14, can be controlled to the same one. Accordingly, the difference H between the levels of the molten glass G in the melting tank and the molten glass G in the vacuum degassing vessel, can be set to be smaller than approximately 3.5 m which is necessary for the conventional apparatus, when the pressure in the vacuum degassing vessel is set to be 1/20 to $\frac{1}{3}$ atmospheric pressure.

In this way, the molten glass G which has passed through the vacuum degassing device 4, is led to the guiding duct 5.

Furthermore, by changing the rotational speeds of the screws 20 and 21, the flow rate of the molten glass G can easily be controlled.

In the first example, the difference H between the levels of the molten glass G in the melting tank and the molten glass G in the vacuum degassing vessel, is set to be smaller than the level difference to which the "siphon" principle is applicable. However, as in a second embodiment shown in FIG. 4, it is possible to set the respective surfaces of the molten glass G in the melting tank and the molten glass G in the vacuum degassing vessel, to the same level, by nullifying the level difference between the molten glass G in the melting tank and the molten glass in the vacuum degassing vessel.

A detailed explanation will be given of a second embodiment of a vacuum degassing method and its apparatus according to the present invention in reference to FIG. 4, as follows.

Figure 4:
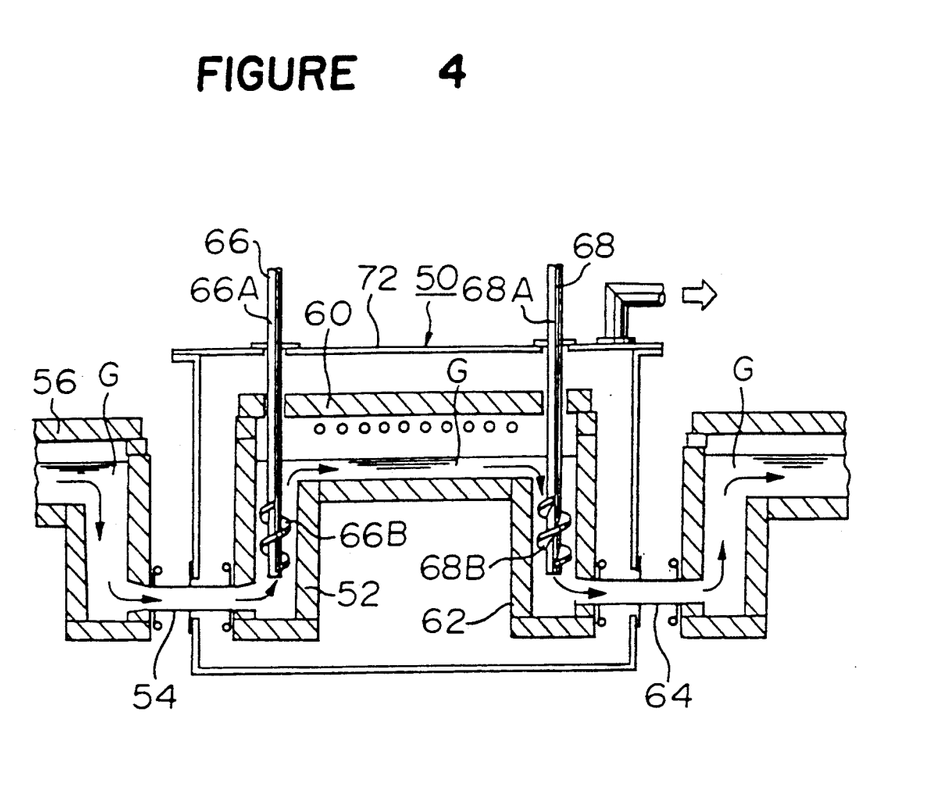
FIG. 4 is a sectional diagram showing the side of a process integrated with a second embodiment of a vacuum degassing apparatus according to the present invention.

As shown in FIG. 4, a vacuum degassing apparatus 50 of the second embodiment is provided with an uprising pipe 52. The lower end portion of the uprising pipe 52 is connected to a cooling tank 56 through a connecting pipe 54. Furthermore, the upper portion of the uprising pipe 52 is connected to the left end portion of the bottom of a vacuum degassing vessel 60. The upper portion of a downfalling pipe 62 is connected to the right end portion of the bottom of the vacuum degassing vessel 60. The bottom of the downfalling pipe 52 is connected to a spout of a successive step through a connecting pipe 64 or the like. The reduced pressure in the vacuum degassing vessel 60 is set to be 1/20 to $\frac{1}{3}$ atmospheric pressure as in the first embodiment.

A screw 66 and a screw 68 are rotatably and coaxially provided in the uprising pipes 52 and in the downfalling pipe 62, respectively. The screws 66 and 68 are composed similar to the screws 20 and 21 in the first embodiment. A blade 66B and a blade 68B are helically provided on a shaft 66A of the screw 66 and a shaft 68A of the screw 68, respectively. When the shaft 66A and the shaft 68A rotate in a constant direction, the blade 66B and the blade 68B push down the molten glass G in the uprising pipe 52 and the downfalling pipe 62 in the downward direction.

In this case, the rotational speeds of the shaft 66A and the shaft 68A are controlled so that surfaces of the molten glass G in the vacuum degassing vessel 60 and the molten glass G in the cooling tank 66 are on the same level. Accordingly, since it is not necessary to elevate the molten glass G at an elevated temperature to a high position (by the difference H between the levels of the molten glass G in the melting tank and the molten glass G in the vacuum degassing vessel as in the first embodiment), the safety thereof is promoted. Furthermore, since it is not necessary to provide the vacuum degassing vessel 60 or the like at a high position, magnifying of facilities and cost reduction of facilities are enabled.

A vacuum housing 72 in the vacuum degassing apparatus 50, is sucked in vacuum by a vacuum pump (not shown) as in the first embodiment.

In the above first and the second embodiments, the screws are employed as the first and the second flow quantity controlling means. However, this invention is not restricted by these examples and may employ other flow quantity controlling means. As the other flow quantity controlling means, for instance, a plunger of which lower end portion is formed in a conical form or the like, may be considered. The conical portions of the plunger is fitted to an upper end portion of each of the rising pipes 13 and 52, and an opening ratio of each of the uprising pipes 13 and 52 is controlled, thereby controlling the rising quantity of the molten glass G.

Furthermore, in the above first and second embodiments, explanation has been given to cases wherein transparent glass is produced. However, the vacuum degassing method and its apparatus of this invention can be employed in the production of colored glass. An explanation will be given of a third embodiment of a method for making colored glass in reference to FIGS. 5 and 6, as follows. A member similar to or the same with the member in FIG. 4 of the second embodiment, is attached with the same notation and the explanation will be omitted.

Figure 5:
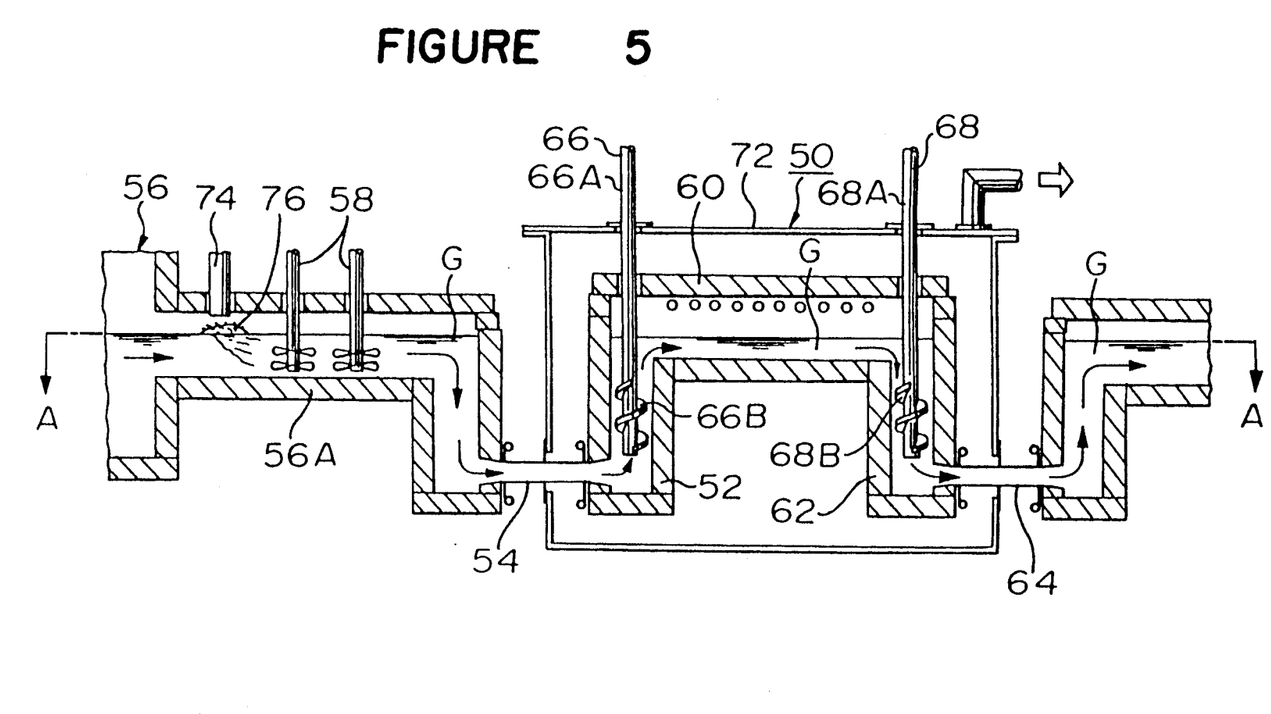
FIG. 5 is a sectional diagram showing an apparatus employed in a third embodiment of a method of making colored glass.
Figure 6:
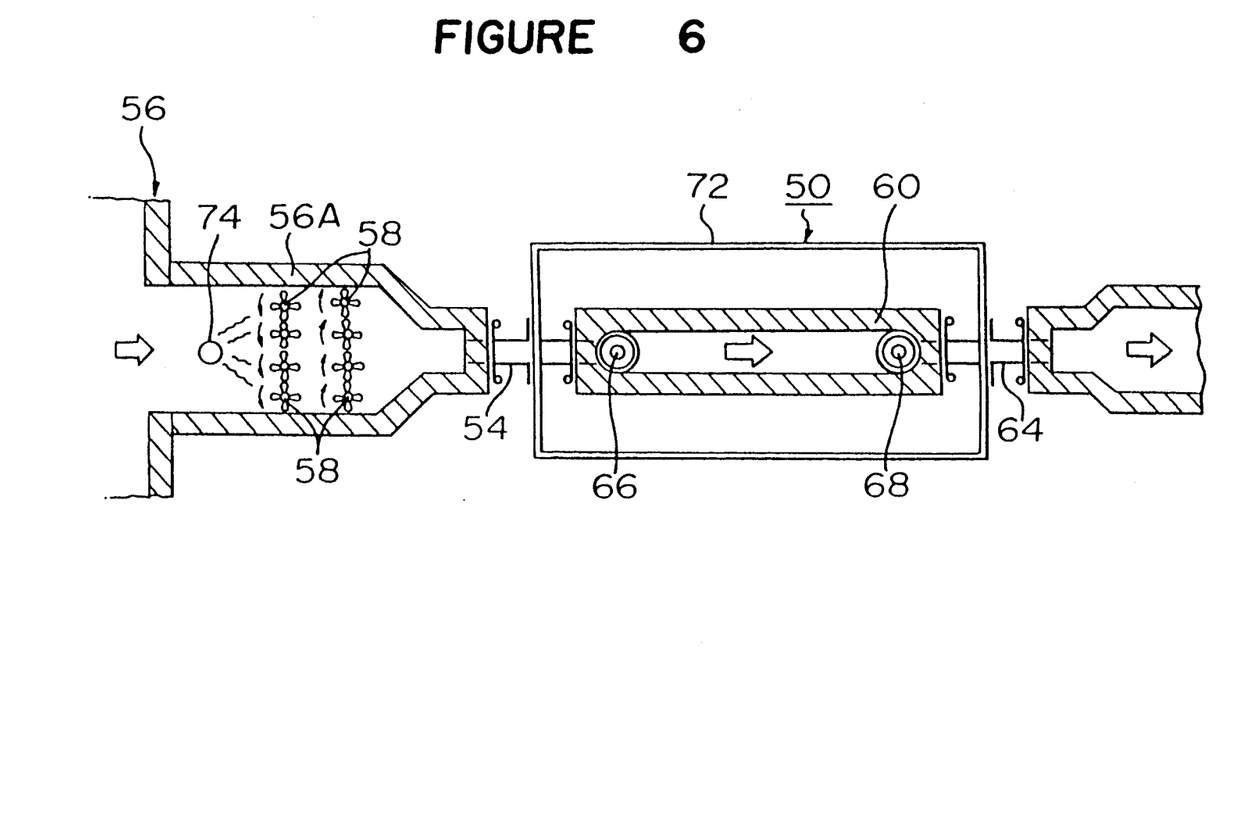
FIG. 6 is a sectional diagram taken along a line A—A of FIG. 5.

A colorant feeder 74 is provided at the upstream portion of a mixing area 56A. The lower end portion of the colorant feeder 74 is situated above the molten glass G. A colorant 76 is charged into the molten glass G from the lower end portion of the colorant feeder 74. In this case, since stirrers 58 are rotated and the molten glass G is stirred to maintain the homogeneous distribution of the charged colorant 76, bubbles are generated in the molten glass G.

Furthermore, the molten glass G generated with bubbles is introduced to the lower end portion of the uprising pipe 52 through the connecting pipe 54. The molten glass introduced to the lower end portion of the uprising pipe 52, rises in the uprising pipe 52. At this occasion, since the screw 66 is rotating, the molten glass G is pushed down in the downward direction by the blade 66B of the screw 66. Accordingly, the rising quantity of the molten glass G is restrained.

On the other hand, since the pressure in the vacuum degassing vessel 60 is reduced to $\frac{1}{2}$ to $\frac{1}{3}$ atmospheric pressure, the molten glass G introduced into the vacuum degassing vessel 60 by rising in the uprising pipe 52, is degassed in the vacuum degassing vessel 60. Accordingly, the bubbles are removed from the molten glass G.

Furthermore, since the screw 68 is rotating in the downfalling pipe 62 at this state, the molten glass G in the degassed state is pushed down in the downward direction by the blade 68B of the screw 68. Accordingly, the molten glass G falls in the downfalling pipe 62 and is discharged from the vacuum degassing vessel 60. In this way, the bubbles can be removed from the molten glass G charged with the colorant 76.

According to the method of making colored glass wherein the addition of the colorant, the stirring and the vacuum degassing are continuously performed, the stirring operates to uniformly distribute the material in the melting tank and the colorant, and the reduced pressure operates to rapidly enlarge the bubbles generated in the stirring chamber and to remove them by floating them. Accordingly, in case of the change of the material to change the color tone of the glass, this invention has an excellent effect in saving the raw material cost and the energy cost and an effect in making homogeneous colored glass. Furthermore, this invention has an effect of reducing bubbles in glass. In the above-mentioned method of making color glass, it is possible to make homogeneous colored glass having little bubbles, in a continuous tank furnace, considerably saving the raw material cost, the energy cost and the like, which are accompanied by the color changing in the continuous tank furnace. Therefore, the industrial value is great.

In the method of making colored glass, the molten glass G added with the colorant 76 is not restricted with respect to the composition so far as the glass is made by the heat-melting method. For instance, lime-silica series glass employed as ordinary window glass and borosilicate glass employed as vessel glass are pointed out.

As the viscosity of the molten glass in case of adding the colorant 76, a value of $10^3$ poise or less is preferable. When the viscosity exceeds $10^3$ poise, the colorant 76 is difficult to be mixed uniformly, which is not preferable. Such molten glass can be provided by continuously charging the raw material which is controlled to have a target composition, and by heating and melting the raw material.

As the colorant added to such molten glass, a metallic ion of Ti, V, Cr, Mn, Fe, Co, Ni, Cu, Mo, Ce or the like, a metallic selenium of an element-like selenium, is pointed out. The kind and the addition quantity of the colorant is determined by a target color tone of glass. Although such colorant may be added in an oxide form or in a metallic form, it is particularly preferable to add the colorant as colored frits previously mixed in frits having a low melting point, since the homogeneous distribution of the colorant in the molten glass, is facilitated.

As shown in FIG. 5, the stirrers 58 stirring the molten glass added with such colorant, are immersed in the molten glass. The stirrer 58 is of a publicly known type provided with a stirring blade attached to a rod-like rotating shaft. Furthermore, instead of the stirrer 58, a stirrer performing a comb-like reciprocating motion, can be employed. The stirrer or the stirrers can be provided singularly or plurally in the direction of flow of the molten glass (in case of FIGS. 5 and 6, two of them are provided in the direction of flow of the molten glass). Or, the stirring may be preformed when the colorant is added.

The viscosity of glass in performing the stirring, is preferably to be $10^2$ to $10^3$ poise. When the viscosity of glass is smaller than $10^2$ poise, the wear of the stirrer becomes considerable, whereas, when the viscosity is larger than $10^3$ poise, the molten glass and the colorant are difficult to mix together uniformly, which is not preferable. The molten glass uniformly mixed with the colorant is degassed under the reduced pressure. Furthermore, as the pressure in case of performing the degassing, a value of 1/20 to $\frac{1}{3}$ atmospheric pressure is preferable. When the pressure is higher than $\frac{1}{3}$ atmospheric pressure, the degassing action is deteriorated, which is not preferable. Conversely, when the pressure is lower than 1/20 atmospheric pressure, the apparatus is magnified, which is not preferable. Furthermore, the time of holding the glass under the reduced pressure, and the viscosity of glass depend on a quantity of allowable residual bubbles. For instance, in case of allowing bubbles of 0.1 particle per kg, the purpose of decreasing bubbles can be sufficiently achieved by the viscosity of glass of $10^2$ to $10^{2.5}$ poise and the holding time of approximately 0.5 to 2 hours.

The glass which is removed of the bubbles as above, is controlled of its temperature to a predetermined temperature, is transmitted to a floating bath or the like and is formed continuously.

On the other hand, in case of changing the material for changing the color tone of the obtained glass, the color tone of the material can be changed by changing the colorant while the molten glass in the melting tank remains as it is.

Figure 8:
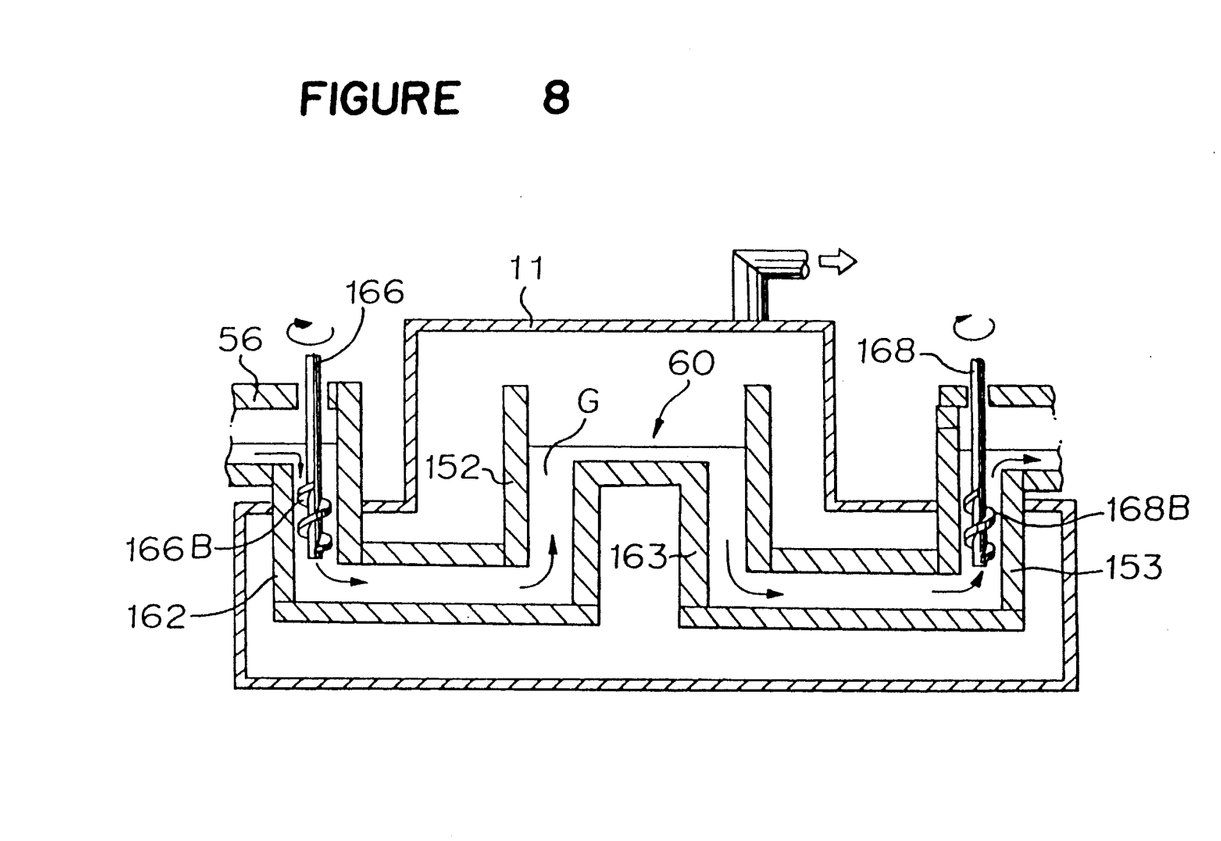
FIG. 8 is a sectional diagram of a fourth embodiment of a vacuum degassing apparatus according to the present invention.

Next, an explanation will be given to a fourth embodiment of this invention in reference to FIG. 8. This embodiment is a particularly preferable embodiment in this invention.

At the end of the cooling tank 56, a first downfalling pipe 162 is provided. The bottom thereof is connected to the bottom of a first uprising pipe 152. The upper end portion of the first uprising pipe 152 is connected to the vacuum degassing vessel 60. The downstream end of the vacuum degassing vessel 60 is connected to the upper end portion of a second downfalling pipe 163. The bottom of the second downfalling pipe 163 is connected to the bottom of a second uprising pipe 153. The first downfalling pipe 162 is provided with a screw 166 wherein a blade 166B is helically provided. The screw 166B rotates in the directions of the arrow mark, operates to pull up the falling molten glass in the upward direction, and, as a result, controls the flow quantity of the molten glass G rising in the first uprising pipe 152. Similarly, the second uprising pipe 153 is provided with a screw 168 having a helical blade 168B. This screw rotates in the direction of the arrow mark, and operates to pull up the rising molten glass. As a result, the flow quantity of the molten glass falling in the second downfalling pipe 163, is controlled.

The glass surface in the vacuum degassing vessel 60 and the glass surface in the cooling tank 56 are controlled to be approximately on the same level, by these screws 166 and 168.

The lower end portion of the first downfalling pipe 162, the lower end portion of the second uprising pipe 153, the first uprising pipe 152, the vacuum degassing vessel 60 and the second downfalling pipe 163 are all arranged in the vacuum housing 11. On the other hand, the upper end portion of the first downfalling pipe 162, the upper end portion of the second uprising pipe 153 and the upper end portions of the screws 166 and 168 are all arranged outside the vacuum housing 11.

The pressure inside the vacuum housing 11 is set to be 1/20 to ⅓ atmospheric pressure as in the first and the second embodiments. In the fourth embodiment, since movable portions of the screws 166 and 168 are arranged outside the vacuum housing 11, seals are not necessary. Therefore, this is a particularly preferable device.

As stated above, according to the vacuum degassing vessels and its apparatus of this invention, even when the the height of the vacuum degassing vessel is set to be low, the rising quantity of the molten substance at elevated temperature in the uprising pipe and the falling quantity of the molten substance in the downfalling pipe, can be controlled to the same quantity. Accordingly, it becomes possible to reduce the level difference between the molten substance in the vacuum degassing vessel and that in the storage tank and the guiding ducts, or to nullify the level difference. Accordingly, since the lengths of the uprising pipe and the downfalling pipe can be set to be short, the promotion of the safety of the vacuum degassing apparatus can be achieved.

Furthermore, since it is not necessary to bring the molten substance to a high position by nullifying the level difference between the surfaces of the molten substance in the vacuum degassing vessel and that in the storage tank and the guiding ducts, the safety is promoted.

Furthermore, it is possible to easily control the flow quantities of the molten substance flowing in the uprising pipe and that in the downfalling pipe by the first and the second flow quantity controlling means.

We claim:

1. A vacuum degassing method for degassing molten glass, the method comprising the steps of:

sucking a heated molten substance in a storage tank into a vacuum degassing vessel through an uprising pipe which connects the storage tank and the vacuum degassing vessel by maintaining the vacuum degassing vessel at a negative pressure;

degassing the molten substance wherein the degassed molten substance flows down to a guiding duct through a downfalling pipe which connects the vacuum degassing vessel and the guiding duct;

restraining a first flow quantity of the molten substance rising in the uprising pipe by rotation of a first screw means positioned in said uprising pipe; and controlling a second flow quantity of the degassed molten substance flowing in the downfalling pipe by rotation of a second screw means positioned in said downfalling pipe;

wherein a quantity of the molten substance in the vacuum degassing vessel is maintained at an amount which prevents an overflow of molten substance in the vacuum degassing vessel.

2. The vacuum degassing method according to claim 1, comprising the further step of:

maintaining a height of a first surface of material of the molten substance in the vacuum degassing vessel the same as a height of a second surface of material of the molten substance in the storage tank.

3. A vacuum degassing method for degassing molten glass, the method comprising the steps of:

providing a vacuum degassing vessel in a vacuum housing;

sucking a molten substance into the vacuum degassing vessel through a first uprising pipe;

controlling a first flow quantity of the molten substance rising in the first uprising pipe by rotation of a first flow quantity control means which is positioned in a first downfalling pipe, said first downfalling pipe being provided upstream of said first uprising pipe and downstream of a storage area for said molten substance with respect to a flow direction of said molten substance and having a bottom which is connected to a bottom of the first uprising pipe;

degassing the molten substance in the vacuum degassing vessel such that the degassed molten substance flows down through a second downfalling pipe; and controlling a second flow quantity of the degassed molten substance flowing in the second downfalling pipe by rotation of a second flow quantity control means positioned in a second uprising pipe, said second uprising pipe being provided downstream of the second downfalling pipe with respect to a flow direction of said degassed molten substance and having a bottom which is connected to the bottom of the second downfalling pipe;

wherein top portions of the first and second flow quantity control means are positioned outside of the vacuum housing, and the first and second flow quantity control means maintain a first surface of the molten substance int he vacuum degassing vessel at a level which is substantially the same as a level of a second surface of the molten substance which is in said storage area before said degassing step.

4. The vacuum degassing method according to claim 3, wherein the first and the second flow quantity control means are screws which are respectively rotatably positioned in the first downfalling pipe and in the second uprising pipe.

* * * * *